(12) United States Patent
Drumm

(10) Patent No.: US 12,124,235 B2
(45) Date of Patent: Oct. 22, 2024

(54) SELF-LEARNING ROUTINE FOR CHECKING COMPATIBILITY

(71) Applicant: Siemens Aktiengesellschaft, Munich (DE)

(72) Inventor: Oliver Drumm, Eggenstein-Leopoldshafen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 400 days.

(21) Appl. No.: 17/628,957

(22) PCT Filed: Jul. 24, 2019

(86) PCT No.: PCT/EP2019/069976
§ 371 (c)(1),
(2) Date: Jan. 21, 2022

(87) PCT Pub. No.: WO2021/013348
PCT Pub. Date: Jan. 28, 2021

(65) Prior Publication Data
US 2022/0260962 A1    Aug. 18, 2022

(51) Int. Cl.
G05B 13/02    (2006.01)
G05B 19/042   (2006.01)

(52) U.S. Cl.
CPC ..... *G05B 19/0426* (2013.01); *G05B 13/0265* (2013.01); *G05B 2219/2243* (2013.01)

(58) Field of Classification Search
CPC ............ G05B 19/0426; G05B 13/0265; G05B 2219/2243
See application file for complete search history.

(56) References Cited

U.S. PATENT DOCUMENTS

| 5,481,716 A * | 1/1996 | Morshedi ................. G06F 8/30 700/86 |
| 2004/0010709 A1 | 1/2004 | Baudoin et al. |

(Continued)

FOREIGN PATENT DOCUMENTS

| CN | 1714327 | 12/2005 |
| CN | 1797310 | 7/2006 |

(Continued)

OTHER PUBLICATIONS

International Search Report dated Apr. 3, 2020 based on PCT/EP2019/069976 filed Jul. 24, 2019.

*Primary Examiner* — Michael W Choi
(74) *Attorney, Agent, or Firm* — Cozen O'Connor

(57) ABSTRACT

A control program for an industrial technical control system is created via a planning tool, wherein the control program includes program data that are assigned names by the planning tool, where beforehand, the planning tool checks the names of the program data of the control program via a checking routine for compatibility with the data processing device, and if the planning tool identifies an incompatibility by means of the checking routine, then it outputs a corresponding error message to the user, otherwise it outputs to the user either no message or a message indicating that no errors have been identified, and the planning tool receives an assessment of the control program from the data processing device and post-trains the checking routine based on the relevant control program and received assessment such that the checking routine gradually learns which names for the program data are compatible with the data processing device.

7 Claims, 2 Drawing Sheets

(56) References Cited

U.S. PATENT DOCUMENTS

| | | | |
|---|---|---|---|
| 2008/0082959 A1* | 4/2008 | Fowler | G06F 9/44505 717/104 |
| 2010/0204809 A1 | 8/2010 | Reuter | |
| 2015/0229660 A1 | 8/2015 | Palmin | |
| 2016/0098035 A1 | 4/2016 | Sinn et al. | |
| 2016/0231737 A1 | 8/2016 | Drumm et al. | |
| 2019/0258676 A1 | 8/2019 | Sherrard | |
| 2021/0200662 A1* | 7/2021 | Li | G06F 11/3644 |

FOREIGN PATENT DOCUMENTS

| | | |
|---|---|---|
| CN | 101799665 | 8/2010 |
| CN | 104850093 | 8/2015 |
| CN | 105164595 | 12/2015 |
| CN | 108803561 | 11/2018 |
| EP | 3056955 | 8/2016 |
| KR | 101882146 B1 | 7/2018 |
| WO | 2012/168198 | 12/2012 |
| WO | 2017210753 | 12/2017 |

* cited by examiner

SELF-LEARNING ROUTINE FOR CHECKING COMPATIBILITY

CROSS-REFERENCE TO RELATED APPLICATIONS

This is a U.S. national stage of application No. PCT/EP2019/069976 filed 24 Jul. 2019.

BACKGROUND OF THE INVENTION

1. Field of the Invention

The present invention relates to an operating method for a planning tool, where a control program for an industrial technical control system is created via the planning tool, where the control program comprises program data, where names are assigned to the program data by the planning tool based on corresponding specifications by a user of the planning tool, on the basis of which names the program data is individualized in relation to the other program data of the control program, where the control program, after its creation by the planning tool, is transmitted to a data processing facility, where before the transmission of the control program to the data processing facility, the planning tool checks the names of the program data of the control program for compatibility with the data processing facility by means of a checking routine, and where the planning tool, whenever it identifies an incompatibility via the checking routine, outputs a corresponding error message to the user and whenever it identifies no incompatibility via the checking routine, outputs either no message or a message indicating that no error has been identified to the user.

2. Description of the Related Art

Different planning tools are often used in system planning. Planning tools within the meaning of the present invention are computing facilities, such as personal computers (PC), which process programs created in software so that control programs for industrial technical control systems are created via the computing facilities.

In order to be able to create the respective control program effectively and with high quality, the data is first created via a first planning tool and then transmitted to a second planning tool. With the second planning tool, further processing occurs using the control program, such as the creation of a further control program. The first planning tool is a planning tool within the meaning of the present invention, the second planning tool a data processing facility within the meaning of the present invention. A typical example of a first planning tool is a so-called system planning tool COMOS, a typical example of a second planning tool a SIMATIC PCS 7.

The interfaces between the planning tools (or the planning tool and the data processing facility) are subject to boundary conditions with regard to the transmitted data. Thus, for example, there may be different restrictions with regard to the length of a name and/or the characters permissible within a name. For example, the planning tool can permit names with a length of up to 15 characters, both upper and lower-case letters as well as digits and spaces being permitted as individual characters. Likewise, for example, the data processing facility can permit names with a length of up to 10 characters, only upper-case letters and digits being permitted as individual characters.

If names are assigned by the planning tool during the creation of the control program that are incompatible with the names permissible for the data processing facility, then the transmission of the control program to the data processing facility there leads to an error. A corresponding error message is transmitted to the planning tool. The names must then be reassigned on the part of the planning tool so that they correspond to the restrictions of the data processing facility. The correspondingly modified control program must then be retransmitted to the data processing facility. This is time-consuming and furthermore, laborious.

In order to be able to ensure proper transmission from the outset, a checking routine can be implemented in the planning tool, via which the names of the program data of the control program are checked for compatibility with the data processing facility before the transmission of the control program to the data processing facility.

Purely theoretically, a complete set of rules for such a checking routine can be created. In practice, however, it appears that the completeness of such a set of rules can only be realized with difficulty and considerable effort. The reason for this can be, for example, that the restrictions of the data processing facility are often only incompletely documented and/or disclosed. The reason for this can furthermore be that the set of rules is highly complex and full implementation is only possible with an unacceptably high effort. Furthermore, the set of rules may change over time.

In practice, such a set of rules is therefore always incomplete, so that during the transmission of the control program from the planning tool to the data processing facility errors occur repeatedly, which the user then has to laboriously eliminate.

SUMMARY OF THE INVENTION

It is an object of the present invention to create an operating method for a planning tool in which a good to very good checking of the names of the program data of the control program for compatibility with the data processing facility is possible within the planning tool with reasonable effort.

This and other objects and advantages are achieved in accordance with the invention by an operating method in which a planning tool receives an assessment of the control program from the data processing facility and the planning tool retrains the checking routine based on the respective control program and the received assessment so that the checking routine gradually learns which names for the program data are compatible with the data processing facility.

As a result, the planning tool can gradually learn via the checking routine which names are permissible for the program data and which are not. With the set of rules unchanged as such, the checking routine will improve continuously over time. If the set of rules changes, then there is a temporary deterioration. However, because the checking routine gradually learns which names for the program data are compatible with the data processing facility, here too there is also an automatic improvement again over time (in particular, without active reprogramming of the checking routine by a programmer).

The checking routine is therefore based on machine learning approaches. An explicit application of test algorithms as such, which have to be constantly adapted by a programmer, can be dispensed with, however.

Machine learning as such is generally known to those skilled in the art. In machine learning, a large number of exemplary data, "training data", and the associated assessments are specified for a corresponding routine. Based on the foregoing, the routine automatically determines the criteria on the basis of which it subsequently assesses specified data. Purely by way of example, neural networks, a multinomial naive Bayes classifier and a stochastic gradient descent classifier can be mentioned. In particular, the latter two classifiers are particularly suitable for learning incrementally and thereby continuously improving the checking routine during normal operation of the planning tool.

Preferably, the planning tool already checks the names of the program data of the control program during the specification of the names by the user. As a result, corrective action can be taken immediately when the user specifies the names.

In some cases, the assessment of the control program transmitted by the data processing facility to the planning tool is purely binary (control program OK or control program not OK). Often, however, there is a more detailed breakdown, such as a statement for the individual names as to whether they are compatible or not. Alternatively or additionally, in the event that the control program is not OK, a breakdown according to the type of error can also occur. In this latter case, it is possible for the planning tool to ask the user for a text explaining the error message and assigns it to the error message whenever an error message is output to the user. If a name is later specified as being incompatible for the same reasons, this procedure enables the user to be informed of the nature of the incompatibility immediately.

It is possible that the checking routine is "completely ignorant" when it is executed for the first time. However, it is alternatively possible that the planning tool implements the previously mentioned steps of the operating method in normal operation. Here, a multiplicity of control programs and a respective assessment of the respective control program can be specified for the planning tool in learning mode.

As a result, the planning tool can train the checking routine in learning mode based on the specified control programs and the associated specified assessments. Learning mode can in particular be performed in advance, i.e., before normal operation is performed for the first time. Learning mode can also be performed at a later time. The difference from normal operation is that the control program is not transmitted to the data processing facility in learning mode. As a rule, the control program is not created either, but is already provided and known in some other way.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The properties, features and advantages of this invention described above and the manner in which they are achieved will become clearer and more comprehensible in connection with the following description of the exemplary embodiments, which are explained in more detail in connection with the drawings, in which.

DETAILED DESCRIPTION OF THE EXEMPLARY EMBODIMENTS

Figure 1:
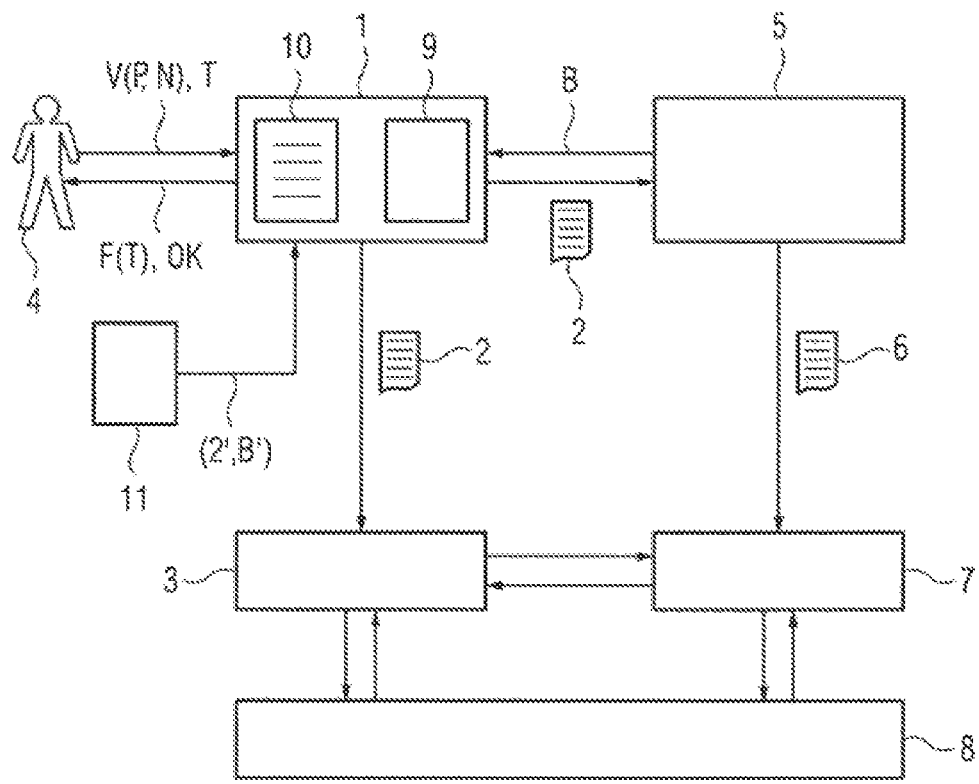
FIG. 1 shows a schematic representation of a planning tool and a data processing facility in accordance with the invention.

With reference to FIG. 1, a control program 2 for an industrial technical control system 3, for example, a programmable logic controller, is to be created via a planning tool 1. The planning tool 1 can be, for example, a conventional, correspondingly programmed computer, in particular a PC or a workstation.

To create the control program 2, the planning tool 1 receives specifications V from a user 4. On the one hand, the specifications V determine, as is generally known, which functionalities are to be implemented via the control program 2. To determine the functionalities, the user 4 defines blocks and units of the control program 2 via which the functionalities are implemented. These blocks and units are the program data P of the control program 2. On the other hand, the specifications V determine the names N with which the blocks and units are designated. With the names N, the blocks and units, i.e., the program data P, are individualized relative to the other program data of the control program 2, such that the block defined by the respective name N or the unit defined by the respective name N is specifically manipulated by the planning tool 1 based on corresponding specifications V of the user 4. The planning tool 1 thus assigns the respective name N to the corresponding blocks and units (or program data P) in accordance with the specifications V by the user 4.

After creating the control program 2, the control program 2 is transmitted from the planning tool 1 to a data processing facility 5. The data processing facility 5 (like the planning tool 1) can be, for example, a conventional, correspondingly programmed computer, in particular a PC or a workstation. The control program 2 is used by the data processing facility 5. For example, the control program 2 can be modified. Alternatively or additionally, another program 6 can be created, taking into account the control program 2, for example, a program for an operating and monitoring system for a control room 7, from which a system 8 controlled via the control program 2 is monitored.

The names N of the program data P are subject to restrictions. This applies both to the planning tool 1 and to the data processing facility 5. In other words, so that the planning tool 1 can correctly process the program data P of the control program 2 individualized by their respective names N, the respective name N must meet the restrictions of the planning tool 1. In the same way, the respective name N must meet the restrictions of the data processing facility 5 so that the data processing facility 5 can correctly process the program data P of the control program 2 individualized by its respective name N.

The restrictions of the planning tool 1 can be readily known to the planning tool 1. In particular, the restrictions can be checked by the planning tool 1 while the user 4 is specifying the names N.

To comply with the restrictions of the data processing facility 5, the planning tool 1 checks the names N of the program data P of the control program 2 via a checking routine 9 for compatibility with the data processing facility 5. If the planning tool 1 detects an incompatibility via the checking routine 9, then the planning tool 1 outputs a corresponding error message F to the user 4. The error message F at least indicates which names N were identified as incompatible. If necessary, the error message F can also indicate the type of error, for example, "character length too long" and/or "invalid character used" and/or "name already assigned elsewhere". Based on the error message F, the user 4 can change the names N detected as incompatible accordingly. If, on the other hand, the planning tool 1 does not detect any incompatibility by means of the checking routine 9, then the planning tool 1 either does not output a message to the user 4 or the planning tool 1 outputs a message OK to the user 4 that the planning tool 1 has not detected any error.

The planning tool 1 checks the control program 2 for compatibility before the planning tool 1 transmits the control program 2 to the data processing facility 5. The result is that the planning tool 1 only readily transmits the control program 2 to the data processing facility 5 if the planning tool 1 does not previously detect any incompatibility via the checking routine 9.

The data processing facility 5 itself also checks for its part whether the names N of the program data P of the control program 2 meet the restrictions of the data processing facility 5. Based on this check, the data processing facility 5 determines an assessment B. The type and structure of the assessment B can correspond to the error message F. The data processing facility 5 outputs the assessment B to the planning tool 1, which in turn receives the assessment B. Using the control program 2, i.e., the control program 2 transmitted to the data processing facility 5, and the assessment B, the planning tool 1 retrains the checking routine 9. The planning tool 1 thus adapts the checking routine 9. The checking routine 9 is formed as a learning algorithm. Corresponding algorithms are generally known to those skilled in the art. Due to the embodiment as a learning algorithm, the checking routine 9 gradually learns which names N for the program data P are compatible with the data processing facility 5.

It is possible for the planning tool 1 to only execute the checking routine 9 immediately before transmitting the control program 2 to the data processing facility 5. Here, the control program 2 is first created completely and only then are the names N of the program data P checked for compatibility. Preferably, however, the planning tool 1 checks the names N of the program data P of the control program 2 while the user 4 is specifying the names N. The checking routine 9 is thus executed continuously in the background by the planning tool 1 while the names N of the program data P are being specified and intervenes immediately if a name N detected as incompatible is specified.

It is possible that a name N is compatible with the data processing facility 5 although it is classified as incompatible by the checking routine 9. For example, the user 4 can know that the restrictions of the data processing facility 5 have changed, so that a name N, which was previously incompatible, is now compatible. In such a case, the checking routine 9 generates an error message F although there is no incompatibility. In order to also take such cases into account, transmission of the control program 2 to the data processing facility 5 is preferably also permitted when the checking routine 9 detects an incompatibility. It is possible, if required, to perform this transmission unconditionally or only on the basis of express confirmation by the user 4. On the basis of the assessment B, however, the planning tool 1 detects that the incompatibility detected by means of the checking routine 9 is not present. The planning tool 1 can take this fact into account and retrain the checking routine 9 accordingly.

It is possible to retrain the checking routine 9 after each individual transmission of a control program 2. In many cases, however, it makes more sense to first store a certain number of transmitted control programs 2 and the associated assessments B in a table 10 and only retrain the checking routine 9 once a sufficiently large number of pairs of control programs 2 and associated assessments B are stored in the table 10. The number of pairs can be determined appropriately and can be, for example, in the two-digit or three-digit range.

As aforementioned, the error message F can reveal the type of error that has occurred. It is possible that such information is not known to the checking routine 9 in advance. Nevertheless, it is possible to assign corresponding information to the error messages F. For example, it is possible for the planning tool 1 to query a text T with the user 4 whenever an error message F is output to the user 4, and if the user 4 specifies a corresponding text T, to assign the text T to the error message F. The error message F can be explained via the text T. As a result, the error message F can be assigned a plain text that is readily understandable for the user 4, for example, the aforementioned possible texts T "character length too long" and "invalid character used". If the same error occurs again at a later time, then the error message F can then be output together with the text T.

The previously explained operation of the planning tool 1 corresponds to normal operation of the planning tool 1. It is possible to operate the planning tool 1 exclusively in this normal operation. Here, the checking routine 9 is initially "ignorant" and initially does not detect any incompatibilities at all. However, the checking routine 9 learns gradually and becomes continuously "better" as a result. Alternatively, it is possible to implement a learning mode. The learning mode is implemented outside normal operation. In learning mode, the planning tool 1 is given a multiplicity of control programs 2' and an assessment B' for the control programs 2'. In particular, the control programs 2' are thus not created via the planning tool 1. The assessments B' are also not specified by the data processing facility 5 based on the previous transmission of the control programs 2' from the planning tool 1 to the data processing facility 5. Otherwise, the specification can be performed via any input facility 11. For example, the control programs 2' and the associated assessments B' can be written into the table 10 via the input facility 11. Based on the control programs 2' and the associated assessments B', the planning tool 1, detached from the actual creation of control programs 2, trains the checking routine 9 in learning mode.

In summary, the present invention therefore relates to the following substantive matter.

A control program 2 for an industrial technical control system 3 is created via a planning tool 1. The control program 2 comprises program data P that is assigned names N by the planning tool 1 based on corresponding specifications V by a user 4 of the planning tool 1, on the basis of which names N the program data P is individualized in relation to the other program data of the control program 2. After its creation, the control program 2 is transmitted from the planning tool 1 to a data processing facility 5. Beforehand, the planning tool 1 checks the names N of the program data P of the control program 2, via a checking routine 9, for compatibility with the data processing facility 5. If the planning tool 1 identifies an incompatibility by means of the checking routine 9, then it outputs a corresponding error message F to the user 4. Otherwise, the planning tool 1 outputs to the user 4 either no message or an OK message indicating that no error has been identified. The planning tool 1 receives an assessment B of the control program 2 from the data processing facility 5 and retrains the checking routine 9 based on the relevant control program 2 and the received assessment B so that the checking routine 9 gradually learns which names N for the program data P are compatible with the data processing facility 5.

The present invention has many advantages. In particular, errors or incompatibilities are detected at an early stage. The transmission of incompatible control programs 2 to the data processing facility 5 is avoided or at least reduced to a minimum. If the restrictions of the data processing facility 5 change, then the checking routine 9 initially operates somewhat worse. However, the checking routine 9 also learns again here so that the it adapts to and learns the changed restrictions. The error messages F can give the user 4 easily understandable instructions for the correction of errors. An (often difficult) definition of rules that would need be implemented in the checking routine 9 is dispensed with.

Figure 2:
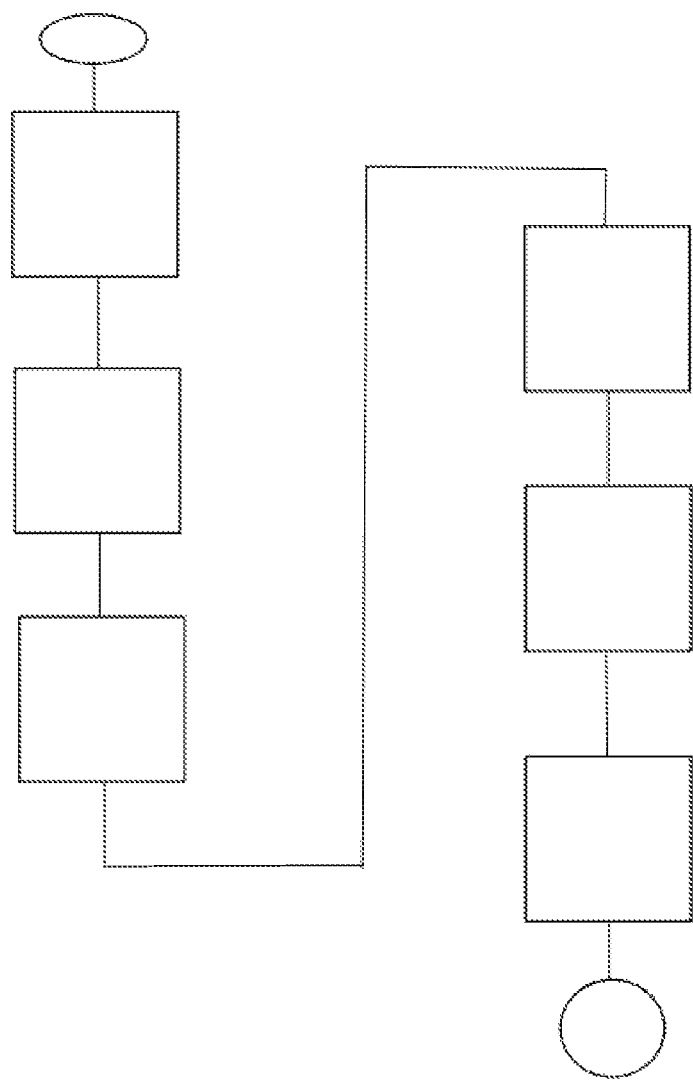
FIG. 2 is a flowchart of the method in accordance with the invention.

FIG. 2 is a flowchart of the operating method for a planning tool 1, where a control program 2 for an industrial technical control system 3 is created via the planning tool 1, and the control program 2 comprises program data P.

The method comprises assigning names N to the program data P by the planning tool 1 based on corresponding specifications V by a user 4 of the planning tool 1, on the basis of which names the program data P is individualized in relation to the other program data of the control program 2, as indicated in step 210.

Next, the planning tool 1 performs a check of names N of program data P) of the control program 2 before the transmission of the control program 2 to the data processing facility (5), via a checking routine 9, for compatibility with the data processing facility 5, as indicated in step 220.

Next, the control program 2 is transmitted to a data processing facility 5 after creation of the control program 2 by the planning tool 1, as indicated in step 230.

Next, the planning tool 1 outputs, whenever said planning tool 1 identifies an incompatibility via the checking routine 9, a corresponding error message F to the user 4, otherwise whenever the planning tool 1 identifies no incompatibility via the checking routine 9, outputs either (i) no message or (ii) a message OK indicating that no error has been identified to the user 4, as indicated in step 240.

Next, the planning tool 1 receives an assessment B of the control program 2 from the data processing facility 5, as indicated in step 250.

Next, the planning tool 1 retrains the checking routine 9 based on the relevant control program 2 and the received assessment B such that the checking routine 9 gradually learns which names N for the program data P are compatible with the data processing facility 5, as indicated in step 260.

Although the invention has been illustrated and described in more detail by the preferred exemplary embodiment, the invention is not limited by the disclosed examples, and other variations can be derived therefrom by a person skilled in the art without departing from the protective scope of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An operating method for a planning tool, a control program for an industrial technical control system being created via the planning tool, the control program comprising program data, the method comprising:
   assigning names to the program data by the planning tool based on corresponding specifications by a user of the planning tool, on the basis of which names the program data is individualized in relation to the other program data of the control program;
   checking, by the planning tool, names of program data of the control program before the transmission of the control program to the data processing facility, via a checking routine, for compatibility with the data processing facility;
   transmitting the control program to a data processing facility after creation of the control program by the planning tool;
   outputting, by the planning tool, whenever said planning tool identifies a name incompatibility via the checking routine, a corresponding error message to the user, otherwise whenever said planning tool identifies no name incompatibility via the checking routine, outputting by the planning tool one of (i) no message and (ii) a message (OK) indicating that no error has been identified to the user;
   receiving, by the planning tool, an assessment of the control program from the data processing facility; and
   retraining, by the planning tool, the checking routine based on the control program and the received assessment such that the checking routine gradually learns which names for the program data are compatible with the data processing facility.

2. The operating method as claimed in claim 1, wherein the planning tool already checks the names of the program data of the control program while the user is specifying the names.

3. The operating method as claimed in claim 2, wherein the planning tool asks the user for a text explaining an error message and assigns said text to the error message whenever an error message is output to the user.

4. The operating method as claimed in claim 2, wherein the planning tool executes the operating method in normal operation; wherein the planning tool is given a specified multiplicity of control programs and a respective assessment of the respective control program in learning mode; and wherein the planning tool trains the checking routine in learning mode based on the specified multiplicity of control programs and associated specified assessments.

5. The operating method as claimed in claim 1, wherein the planning tool asks the user for a text explaining an error message and assigns said text to the error message whenever an error message is output to the user.

6. The operating method as claimed in claim 5, wherein the planning tool executes the operating method in normal operation; wherein the planning tool is given a specified multiplicity of control programs and a respective assessment of the respective control program in learning mode; and wherein the planning tool trains the checking routine in learning mode based on the specified multiplicity of control programs and associated specified assessments.

7. The operating method as claimed in claim 1, wherein the planning tool executes the operating method in normal operation; wherein the planning tool is given a specified multiplicity of control programs and a respective assessment of the respective control program in learning mode; and wherein the planning tool trains the checking routine in learning mode based on the specified multiplicity of control programs and associated specified assessments.

* * * * *